US010699171B2

United States Patent
Govrin et al.

(10) Patent No.: US 10,699,171 B2
(45) Date of Patent: Jun. 30, 2020

(54) AUTOMATED IMAGE SCALE ADJUSTMENT BASED UPON DOCUMENT AND IMAGE CONTEXT

(71) Applicant: Microsoft Technology Licensing, LLC, Redmond, WA (US)

(72) Inventors: Amnon Itamar Govrin, Bellevue, WA (US); Erez Kikin Gil, Bellevue, WA (US); Keri Talbot, Sammamish, WA (US); Aleta Bashaw, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 15/952,013

(22) Filed: Apr. 12, 2018

(65) Prior Publication Data
US 2019/0318212 A1     Oct. 17, 2019

(51) Int. Cl.
*G06K 9/72*     (2006.01)
*G06K 9/00*     (2006.01)
*G06T 3/40*     (2006.01)

(52) U.S. Cl.
CPC ......... *G06K 9/726* (2013.01); *G06K 9/00288* (2013.01); *G06K 9/00463* (2013.01); *G06T 3/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,999,664 A | * | 12/1999 | Mahoney | G06K 9/00463 382/305 |
| 7,043,474 B2 | * | 5/2006 | Mojsilovic | G06F 19/321 |
| 7,689,064 B2 | * | 3/2010 | Miksovsky | G06T 11/60 382/294 |
| 9,153,056 B2 | * | 10/2015 | Hilt | G06T 11/60 |
| 9,418,068 B2 | * | 8/2016 | Maloney | G06F 9/451 |
| 9,990,697 B2 | * | 6/2018 | Hilt | G06T 11/60 |
| 2002/0025085 A1 | * | 2/2002 | Gustafson | G06Q 30/06 382/311 |
| 2008/0320384 A1 | | 12/2008 | Nagarajan | |

(Continued)

OTHER PUBLICATIONS

"International Search Report and Written Opinion Issued in PCT Application No. PCT/US2019/024721", dated Sep. 3, 2019, 11 Pages.

(Continued)

*Primary Examiner* — Tsung Yin Tsai
(74) *Attorney, Agent, or Firm* — Schwegman Lundberg & Woessner, P.A.

(57) ABSTRACT

Disclosed are methods, systems, and machine readable mediums which provide for an automatic image scaling that may be utilized in a variety of contexts, including for scaling images inserted into documents. The image may be scaled based upon one or more scaling features that may be utilized alone or in combination. Scaling features may be described by scaling feature categories, although as will be appreciated, the scaling features may be placed in one or more categories. Example feature categories may include image characteristics; image content; content of the document and context of the image within the document; past user behavior and preferences; and the like.

20 Claims, 7 Drawing Sheets

(56) References Cited

U.S. PATENT DOCUMENTS

| | | | |
|---|---|---|---|
| 2010/0064223 A1* | 3/2010 | Tilton | G06T 13/80 |
| | | | 715/732 |
| 2011/0026839 A1* | 2/2011 | Bogart | G06T 11/60 |
| | | | 382/217 |
| 2014/0307980 A1* | 10/2014 | Hilt | G06T 11/60 |
| | | | 382/284 |
| 2015/0371366 A1* | 12/2015 | Hilt | G06T 11/60 |
| | | | 382/284 |
| 2016/0139761 A1* | 5/2016 | Grosz | H04N 1/00188 |
| | | | 715/769 |

OTHER PUBLICATIONS

Yang, et al., "Automatic Generation of Visual-Textual Presentation Layout", In Journal of ACM Transactions on Multimedia Computing Communications and Applications, vol. 12, Issue 2, Feb. 9, 2016, 22 Pages.

\* cited by examiner

AUTOMATED IMAGE SCALE ADJUSTMENT BASED UPON DOCUMENT AND IMAGE CONTEXT

BACKGROUND

Document creation applications such as word processing programs, web-page editors, image manipulation programs, messaging programs (e.g., email) and the like allow for the insertion of images alongside of text, graphics, or other visual elements according to a particular layout. The layout may be explicitly selected by a user (e.g., through a document template), or the user may manually adjust the image with respect to the other visual elements by dragging and dropping the image and/or the other elements to implicitly create the layout.

As part of this process, the user often resizes the images to fit in context with the rest of the document and with the layout. This process may be time consuming and frustrating. For example, users may be unskilled at document layout and may thus make poor layout choices. Additionally, as users resize the image, the document creation application may reflow or adjust other surrounding elements, which may change the way the user wants to layout the image. This reflow often causes additional adjustment whereby users readjust the layout or size of the image as a result of an automatic adjustment by the document creation tool.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
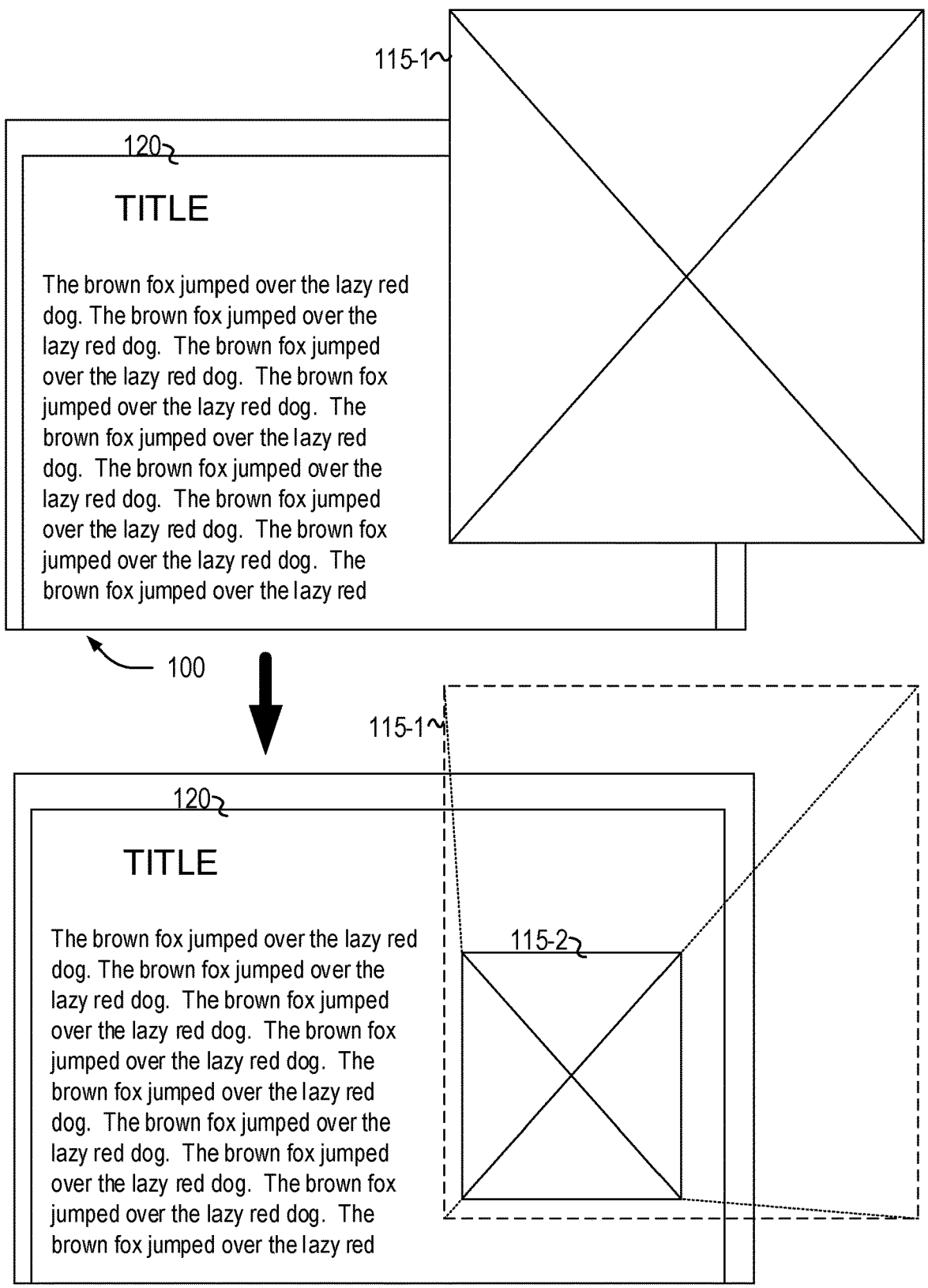
FIG. 1 illustrates an automatic image rescaling according to some examples of the present disclosure.

The current process of adjusting and resizing an image is time consuming and wastes computing resources and energy. The entire process is also frustrating for users on computing devices with large screens. This frustration is even greater for users of smaller form factor devices, such as smart phones and tablets. This is because the touch input mechanism combined with the small screens of these devices do not lend themselves to easily using the traditional image resizing technique of clicking on one of the image's bounding boxes and dragging it to the new size. A user's finger often does not give the required precision, and frequently covers up portions of the image during the resize obscuring the user's view of the layout.

Disclosed in some examples are methods, systems, and machine-readable mediums which provide for an automatic image scaling process that may be utilized in a variety of contexts, including for scaling images inserted into documents. The image may be scaled based upon one or more scaling features that may be utilized alone or in combination. Example features may include features related to the image itself, such as image characteristics and image content; features related to the document, such as a content of the document; features describing a relevance of the image or image contents to the document; and user behavior and preference features.

The automated image scaling solution solves the technical problems of determining a proper image sizing and layout in a document using the technical solutions of scaling the image automatically based upon one or more features of the document, the image, and the like gathered by the document creation application. The disclosure also sets out an improved user interface of the document creation application by making it quicker and easier to insert an image into a document. This user interface improvement also extends particularly to small form factor devices, such as mobile devices and other devices where screen space is limited and traditional images are particularly difficult to adjust on these devices.

One example usage scenario is within a document creation application, but other examples may include providing an Application Programming Interface (API) whereby an application or service may call an image scaling solution with parameters such as the image, the document in which the image is placed, or other contexts of the user and the API returns an image size (or scales the image to the optimum image size) that is selected based upon the disclosed features. As an example, a network-accessible storage solution may store user pictures and a network based document creation service may access photos stored on the network-accessible storage solution. These photos may be passed using an API to yet another network-accessible service to calculate a size based upon the above mentioned factors.

As previously noted, the image may be rescaled based on features related to an image itself, such as image characteristics and image content. Example image characteristic features include the image resolution, aspect ratio, and image detail. For example, a low-resolution image may be scaled to a smaller size than a high-resolution image. The automatic image scaling process may scale images so that they maintain their aspect ratio. This may be utilized in conjunction with a number of other features—thus, a low-resolution image in a 16:9 aspect ratio may be scaled to a smaller size but maintain the 16:9 aspect ratio. Images having high frequency components (e.g., portions of the image that have a high rate of change) may be sized larger to ensure the high frequency elements are visible in the picture.

Example image content features may include recognized or tagged objects detected in the image. For example, a famous landmark, a face, or the like may be tagged by users, or may be automatically recognized by the system using object recognition algorithms. Images may be scaled to ensure that certain objects are properly visible. In some examples, the size of the image may be determined based upon the subject of the image. Scenery may be kept full size, headshots may be scaled to a smaller size, images that have text may be larger, and the like.

Another image content feature may be a determined relevance of one or more recognized objects depicted in the digital image to a portion of the document may also be utilized. The image content may also be considered in combination with the content or semantic meaning of other items in the document (or the semantic meaning of the document itself) such as nearby elements (e.g., within a determined vicinity) such as text or other images and/or a determined semantic meaning of the document. For example, if the image displays a headshot, and other nearby images display headshots, then the image may be sized similarly to the other headshot images. Similarly, if the image displays an object, person, or other item of interest that the text of the document references, the image size may be increased as the image may be deemed relevant to the context of the document. If the image includes logos, icons, decorations, clip art or other items, the image size may be increased to ensure readability of those items.

With respect to the determined relevance of one or more recognized objects depicted in the digital image to a portion of the document, a placement position in the object may affect the determined relevance. In some examples, if an object (or the image itself) is referenced before or after the desired placement position in the document, the image may be sized larger than had the image or objects in the image not been mentioned. The desired placement position may be a position for the image selected by the user. In some examples, if an image is only mentioned right before or right after the desired position in the text, the image may be sized larger than it would have had the image or an object in the image not been mentioned, but not as large as if the entire document is about the image or an object in the image. In some examples, the image size may be determined based upon a contrast of the image with the background. For example, a dark image may be made larger if the portion of the document it is being inserted into is dark (to ensure legibility of the image).

Example document content features may include a determined semantic meaning of the document. For example, text content and other images in the document may be processed by the document creation application to determine a semantic meaning. In some examples, the entire document may be processed to determine a semantic meaning, in other examples a section within a determined distance of where the user is attempting to insert the image is used to determine the semantic meaning of that section. Images that contain objects or describe the semantic meaning of the document may be sized larger.

Other content features may include a type of document (presentation, word document, webpage) which may a factor in determining an appropriate size. For example, an image inserted into a presentation may be sized larger to ensure it is viewable when projected. An image inserted into a webpage may be sized to ensure that it is not too large as to use up too much bandwidth. In addition, the image may be sized to correspond with a desired position and available space in a document. For example, the image may be sized to fit in a desired area, to be sized similarly to surrounding text or images, and the like.

Other features may include past user behaviors and other user contexts that may be leveraged to determine an appropriate size. For example, the relationship of the image to the author, the recipient, or some other user. For example, images that depict the recipient may be sized larger than images that do not depict the recipient. Other user contexts may include a user location (e.g., certain images may be increased in size to highlight pictures of local landmarks).

In some examples, past behaviors may be utilized. The past behaviors may be for this particular document, or for documents in general. For example, a user may be creating a lineup of pictures and the system may recognize that the user has sized inserted photos to the same size three times in a row. On the fourth image, the system may resize the image to the same size as the previous three automatically without user input. In some examples, past user behaviors may be based upon detected image objects, types, document, characteristics, and the like. For example, the system may detect that a user has enlarged or reduced a sizing of images with particular objects, particular image characteristics, or the like in particular documents with particular contexts and may apply those changes for future images matching those characteristics. In other examples, the user context may include other documents the user has opened, edited, or viewed.

Other features may include external contexts such as a time and/or a date. Thus, pictures of spring may have a larger size than pictures of fall when the document is created in the spring. Other external contexts include current events. A person, company, place, or other item in the news may be sized larger.

It should be noted that the document creation tool may allow the user to control the extent of the personal information collected. For example, a menu may allow a user to control how much and what types of preference data are collected. In addition, should the user disagree with the sizing decision, the user may cancel the automatic sizing (e.g., by one or more hot keys or by navigating through one or more menu options) or may manually adjust the sizing. The system may utilize these inputs as signals to modify a model or other algorithm utilized to calculate the image size.

As used herein, a feature may be one or more observations that may be suggestive of an appropriate image size. The image size may be calculated based upon one or more of the above listed features. For example, the system may calculate the image size based upon one or more rules that may determine how to scale the image given the various features that are input. The rules may be if-then statements. Other example algorithms used to calculate the image size may include supervised and unsupervised machine learning algorithms which may utilize a model that takes feature data as input to determine how to scale the image. In still other examples, the system may utilize a weighted summation to determine a percentage to scale the image.

In some examples, the document creation application may calculate an absolute size—e.g., the algorithms may produce a horizontal and vertical size of the image. In other examples, the document creation application may calculate a scaling factor—e.g., that the image should be scaled +/− a percentage. In yet other examples, the calculated size may be relative to one or more other elements in the document. In yet other examples, the size may be calculated each time a user opens the document so that the size of the image is dynamic.

Turning now to FIG. 1, an automatic image rescaling is illustrated according to some examples of the present disclosure. First view 100 shows a document creation tool with a document 120. A user may indicate that they wish to insert an image. The image may be represented by box 115-1 in an original size of the image. The user may indicate a desire to insert the image by navigating to a menu option and selecting an image, by dragging and dropping an icon representing the image into the document from another user interface window, by pasting an image from the clipboard into the document, and the like. The system may automatically resize the image to a second size represented by box 115-2 in second view 110. As shown in second view 110 and by box 115-2, the image may be scaled to better fit the available space next to the text. The system may resize the images to one of a predetermined number of sizes (e.g., small, medium, or large image sizes that are predetermined) or may size the image to any size as defined by a horizontal and/or vertical size. In other examples, the image may be resized to a relative size (e.g., full width, column width, aligned to the content above it, etc.) with respect to the document width and/or with respect to a viewport (e.g., a screen size).

Figure 2:
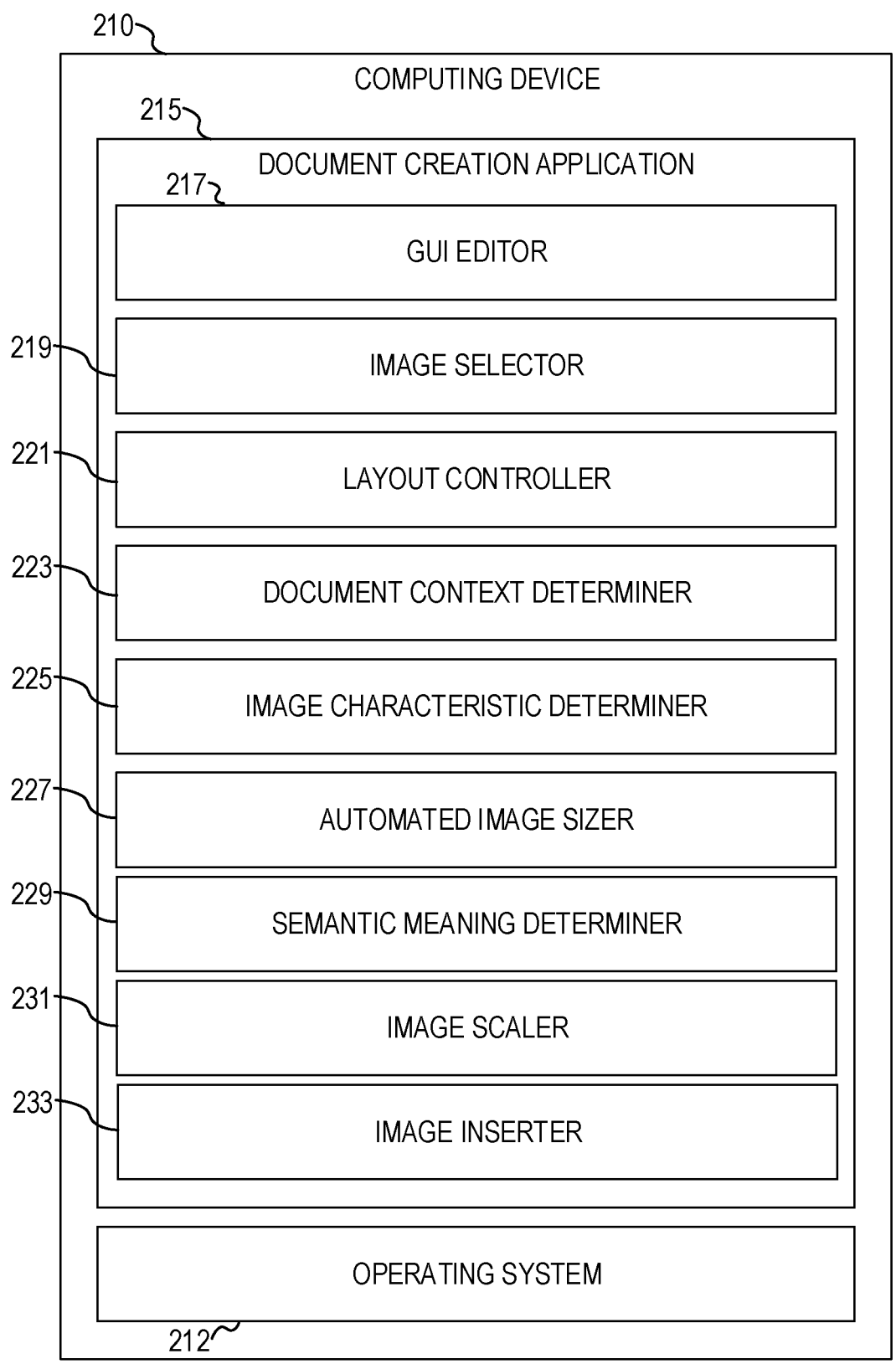
FIG. 2 illustrates an example computing device on which the automated image scaling system may be executed according to some examples of the present disclosure.

FIG. 2 shows an example computing device 210 on which the automated image scaling system may be executed according to some examples of the present disclosure. As described in FIG. 2, the components of the system may reside on a single computing device. In other examples, one or more of the components may reside on a network-based computing device. For example, the document and/or the image may be sent to a network-based computing device to take advantage of the computing power of those devices and the image size may be sent back to the computing device. In some examples, the models may be trained, maintained, and refined on the network computing device and may be sent from the network computing device to the computing device. This may be done periodically in response to new training and/or feedback data. While certain components are shown in FIG. 2, it will be understood by one of ordinary skill having the benefit of the present disclosure will appreciate that the components in FIG. 2 are exemplary and there may be greater or fewer components than shown in FIG. 2 and that the functionality described may be performed by different components than that described.

Computing device 210 may include an operating system 212. Operating system 212 may provide one or more services for application layer programs such as the document creation application 215. For example, operating system 212 may manage and provide access to hardware devices—such as by providing an API through which the applications in an application layer may access the hardware. Other example services provided by the operating system 212 may include memory management, thread management, providing a graphical user interface (GUI) framework, providing an event framework, enabling messaging across applications, and the like.

Document creation application 215 may be a word processing application, a photo editing application, a slideshow application, a presentation application, a web page development application, an email application, a messaging application, and the like. Documents created by the document creation application 215 may include one or more of word processing documents, photo slide shows, text documents, presentations, web pages, electronic messages, text messages, multimedia messages, audio-visual presentations, videogames, and the like. As used herein, a document is a collection and organization of one or more elements such as images, text, video files, sound files, and the like.

Document creation application may include a GUI editor component 217 which may provide one or more views of the document that is being edited and may allow the user to enter input to edit the document. For example, the user may click or otherwise select a location in the document and add text (by typing on a text input device such as a keyboard), graphics, images, or the like at the selected location. The provided GUI may have layout functions, editing functions, saving functions to save the document to computer storage, and the like.

Image selector component 219 may provide functionality that allows a user to select and place an image within the document. For example, by utilizing a menu within the GUI provided by the GUI editor component 217, by dragging an icon or thumbnail representation of an image from a file explorer window, or other window into the document, by copying an image and pasting it into the document, or the like.

Layout controller 221 may determine a layout for the elements with respect to each other within the document using layout rules. For example, the layout controller 221 may determine a document size and may layout text, graphics, and other elements such that those elements fit within the document. For example, the layout controller 221 may cause text to be "wrapped around" to another line if the text exceeds a document width. The layout controller 221 may also configure the layout of images and other components with respect to each other. For example, if an image is inserted, the layout controller 221 may utilize layout rules to determine how text will be aligned to flow around the image. In some examples, the layout controller 221 may utilize information from the automated image sizer 227 (that it determined from one or more features) to improve the layout of the document with respect to the images in the document. For example, the layout controller 221 may link one or more portions of text from the document with various images based upon the image being mentioned in the text. Thus, if a viewport size changes (e.g., a window is resized), the text and the image may be kept together.

Document context determiner 223 may determine a context of the document. For example, if the user is trying to insert an image at a particular position in the document, the document context determiner 223 may determine a context of the document at that position. For example, the document context determiner may utilize images (including an image that the user is trying to insert), the document, and other inputs to determine a context of the document.

Document contexts determined by the document context determiner 223 may include a size of the document, a type of document, a free space of the document at a position that the user wishes to insert the image, a layout of other images, an end goal of the user for the document (e.g., a resume, a presentation, a report, a slideshow of images, and the like) and the like. Document context determiner 223 may also determine the context of the user (e.g., their location, preferences, past habits, and the like).

Semantic meaning determiner 229 may determine a semantic meaning of the document—such as a semantic meaning at a position at which a user desires to insert an image. This may be utilized to determine a relevance of an image or objects detected in the image to the document. For example, the document creation application 215 may utilize one or more machine-learning algorithms to determine the semantic meaning. For example, a Latent Dirichlet algorithm (LDA), a latent semantic analysis algorithm such as Probabilistic Latent Semantic Indexing (PLSI), hidden Markov models, or the like. The semantic meaning may include mentions of various objects and things as well as an understanding of the subject matter of the document. Using semantic meaning of the document as a feature allows for not only increasing the size of the image in response to direct mentions of objects depicted in the image but indirect mentions—thus if the document is about conservation and the image depicts a recycling facility, the image may be sized larger as it relates to the topic of the document.

In addition, semantic meaning determiner 229 may determine a meaning of one or more images and identify one or more objects in an image. For example, the semantic meaning determiner 229 may implement a scale-invariant feature transform (SIFT) algorithm, a genetic algorithm, a convolutional neural network, and the like to detect and identify objects depicted in images.

In some examples, the semantic meaning determiner 229 may utilize the detected objects to produce a keyword list. For example, a landmark may have a list of names used to refer to the landmark. This list may comprise generic terms describing the detected objects such as "building," "dwelling," "home" and specific terms that uniquely describe the particular detected object, for example "Lincoln's boyhood home." This list of keywords may be utilized to search the document text near where the image is located to find instances where the image or objects in the image are relevant to the digital image. The number of matching keywords may be indicative that the text describes the image and that the image is important and should be larger within the context of the document. For example, the number of matching keywords may be input into the model or other algorithm operated by the automated image sizer 227 to determine the image size.

Image characteristic determiner 225 may determine an original size, resolution, contrast, color profile, frequency (e.g., calculated by a Fast Fourier Transform), and the like of one or more images. The image characteristic determiner 225 may determine characteristics of an image a user wishes to insert into a document and characteristics of images already in the document.

In some examples, a relevance of objects detected in an image to the document may be determined by either the semantic meaning determiner 229 and passed to the automated image sizer 227 (e.g., as part of the semantic meanings) or by the automated image sizer 227. As noted below, the determined relevance may be considered a determined importance of the one or more recognized objects depicted in the image to the portion of the digital document in proximity to the desired placement position. The determined importance may be calculated or determined by the automated image sizer (e.g., automated image sizer 227 or the semantic meaning determiner 229) using algorithms such as the decision tree, weighted summation, or neural network and the like.

As noted, one of the features used to determine image size may be a determined relevance of one or more recognized objects depicted in the digital image to a portion of the digital document. Consider the example of a user attempting to insert a picture of a tree in a document that is about trees. The document creation application 215 may determine that a semantic meaning of the document is about trees and that a specific portion of the document near desired placement position is about oak trees. If the image the user is trying to insert is an oak tree image, the automated image sizer 227 may increase the size of the image as both the document and the portion of the document near the desired placement position reference oak trees. If the portion of text of the document near the desired placement position of the image does not discuss an oak tree, the automated image sizer 227 may increase the image size (e.g., because the document discusses trees), leave it unchanged (because it doesn't discuss the specific type of tree depicted in the image), or decrease the image size (as more weight may be given to relevance that is close to the image insertion point). In other examples, the image size may be increased as a result of the image matching the semantic meaning of the document or being mentioned in the document and may be increased even more if the document mentions the image or objects depicted in the image near the desired placement position of the image. In some examples, if the image has multiple trees, the relevance of the image may be increased based upon the number of times the trees depicted in the image are mentioned in the document.

One feature may be a semantic hierarchy as it relates to an inherent property of the object in the image and a relation to a second image and the related content in the document. For example, if the document is talking about forestation in Washington, and the images depict a forest (group of trees), oak, eucalyptus, and cherry. In terms of hierarchy, the image of the forest would be higher in hierarchy, and might relate to the entirety of the document, while the individual trees might be illustrative for specific parts in the documents or grouped at the same size for decorative purposes.

In another example, if we have several images of soldiers. Some of the soldiers might be at a higher hierarchy (and thus sized larger), based on their equipment, decoration, uniform type, or rank (if visible). The system may unify some of the images or enlarge others, based on their relative hierarchy.

In yet another example, if the document is a newsletter, the system may automatically enlarge an image based upon on the recipient of the newsletter. For example a school newsletter may enlarge a size of a picture of a child of the recipient.

Whether the image size is increased, kept the same, or decreased in this example may also depend on how the relevance algorithms are implemented and what factors are determined more important than others. As noted throughout, the factor "importance" may be learned using machine learning algorithms, may be input by an administrator, or the like. In addition, as also noted, other factors may be utilized in conjunction with the relevance. For example, the features related to relevance may be one of many features considered and thus even if the portion of text of the document near the desired placement position describes the image, the image may nevertheless be scaled to a smaller size if other features indicate that the image should be sized smaller.

As another example, a person depicted in the image may be determined to be relevant to the document. For example, an image of a teacher may be more relevant in a newsletter for a classroom than a student and thus the teacher's image may be bigger. In other examples, a mathematics textbook may indicate that the automated image sizer 227 increase a size of an image showing a graph of an equation near the equation in the text. Examples of relevance of an image or objects in the image may be not only relevance of the image to text in, or meaning of, the document, but also relevance to other media (images, sounds, videos) in the document. For example, if the document is a class picture (with individual pictures arranged in a grid), each picture, as inserted, may be determined as equally relevant to the document and thus sized equally. Other examples may include increasing the size of images relevant to an audio file in the document (e.g., a picture of a composer or performer of the audio file), images relevant to content of a video (e.g., a still image from the video), and the like.

Automated image sizer 227 may utilize one or more features of the image and the document to automatically determine a size of the image for placement in the document. For example, the automated image sizer 227 may receive an indication that the user wishes to insert an image into the document. The automated image sizer 227 may submit the document to the document context determiner 223, the semantic meaning determiner 229, and the like. The automated image sizer 227 may also submit the images (both the image to insert and images in the document) to the semantic meaning determiner and the image characteristic determiner. In some examples, the semantic meanings and image characteristics may be cached so that the automated image sizer does not have to recalculate the semantic meanings and image characteristics multiple times. In addition, in some examples, the images and text of the document used as inputs into the automated image sizer are limited to images and/or text within a determined vicinity of the insertion point of the image.

The automated image sizer 227 may utilize one or more scoring, machine learning, or other automated algorithms applied to the features determined by the various other components (e.g., the document context determiner 223, image characteristic determiner 225, semantic meaning determiner 229) to determine a size of the image. The image scaler 231 may then utilize the size calculated by the automated image sizer 227 to scale the image to that size. The determined size may be input to the image scaler 231 to scale the image and the image inserter 233 may insert the image into the document.

Figure 3:
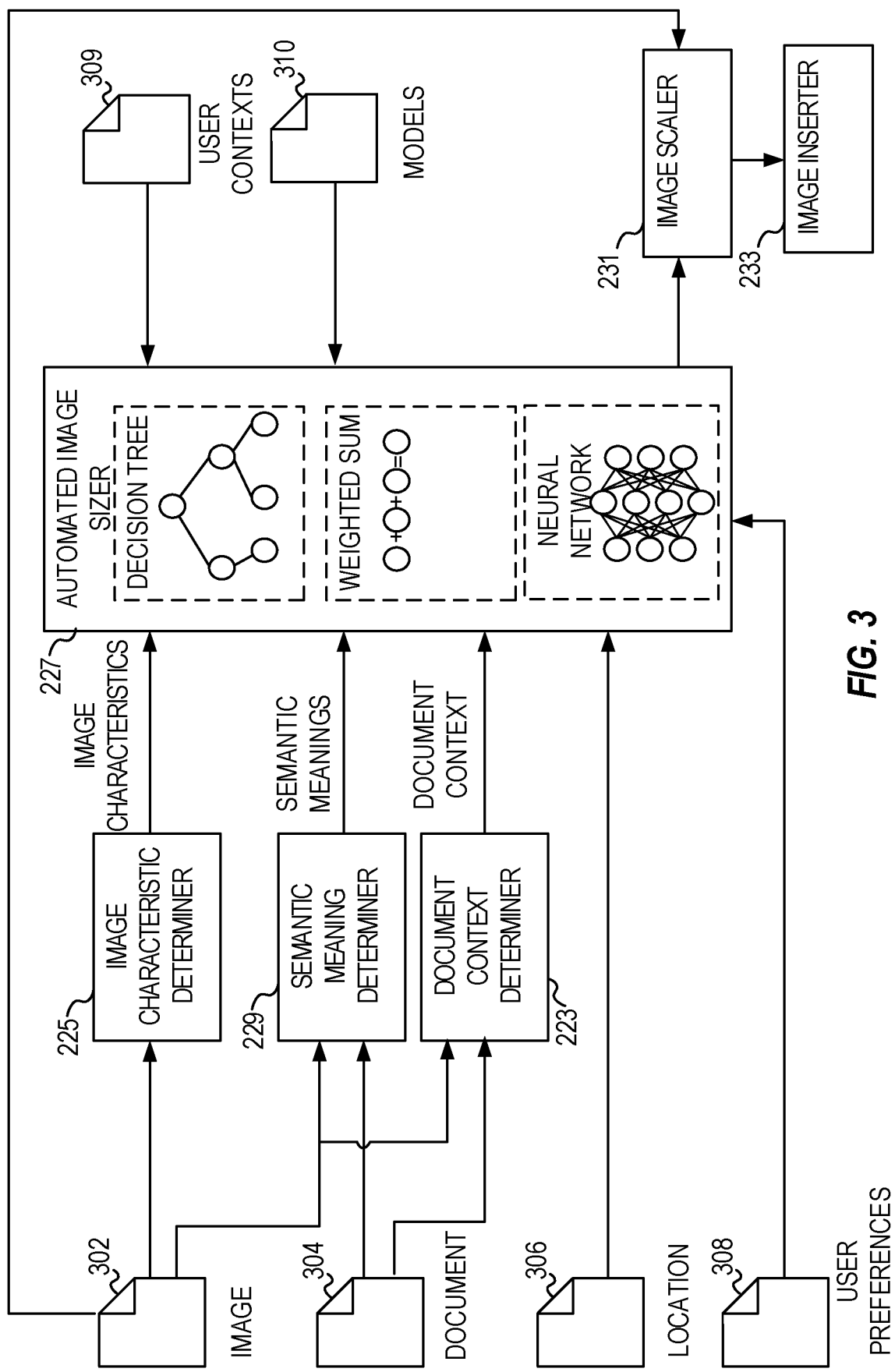
FIG. 3 illustrates a data flow diagram of a document creation application determining a size for an image according to some examples of the present disclosure.

FIG. 3 shows a data flow diagram of a document creation application (e.g., such as document creation application 215) automatically determining a size for an image according to some examples of the present disclosure. For example, image characteristic determiner may determine the characteristics of one or more images, such as the image 302 to be inserted and one or more images from the document 304. These image characteristics may be used as input by the automated image sizer 227.

Semantic meaning determiner 229 may take image 302 and document 304 as input and produce one or more semantic meanings of the image and/or documents. For example, the semantic meaning determiner 229 may utilize a Latent Dirichlet algorithm (LDA), a latent semantic analysis algorithm such as Probabilistic Latent Semantic Indexing (PLSI), hidden Markov models, or the like to determine a document's meaning. The semantic meaning determiner 229 may utilize a SIFT algorithm, a genetic algorithm, a convolutional neural network, and the like to recognize objects depicted within images. Semantic meaning determiner 229 may recognized objects in the image that is to be inserted and/or images in the document—such as within a determined proximity a desired position of the image to be inserted. The semantic meanings and detected objects in the images may be passed to the automated image sizer 227. In some examples, a determined proximity may be within a threshold pixel distance from the desired placement position of the image to the images and/or text. For text, the threshold may be extended to capture the beginning of the sentence or word to ensure appropriate semantic understanding.

In some examples, a relevance of objects detected in image 302 to the document 304 may be determined by either the semantic meaning determiner 229 and passed to the automated image sizer 227 (e.g., as part of the semantic meanings) or by the automated image sizer 227. In some examples, the relevance may be a measure of a similarity of the image and one or more objects depicted in the image to one or more of: the semantic meaning of the document (or a portion of the document); text of the document; other images or media in the document; objects depicted in the image; and the like.

In some examples, this relevance may be calculated using machine learning algorithms using machine learned models (such as neural networks, random forests, decision trees, regressions, and the like) that take as input the objects detected in the image, the semantic meanings of the image and/or the document, the document text, and the like. The machine learning models may be trained based upon a set of labeled training data that may be labeled with a relevance of the image to the document (e.g., a user may label each image's importance to the document on a scale of 0 . . . 10). This data may then be utilized to build a model according to a machine learning algorithm (see e.g., FIG. 6). The model may then be utilized to make future predictions of a relevance of the image to the document. This predicted relevance may then be utilized by the automated image sizer 227 to determine a size for the image (e.g., by using the determined relevance directly or as input to another algorithm or model).

In other examples, the relevance may be determined based upon a count of the number of times that the image or an object depicted in the image is mentioned in the document. In some examples, the relevance may be a count of the number of times the image or an object depicted in the image is mentioned near where the image is to be inserted. In some examples, the relevance may be a count of the number of times the image or an object depicted in the image is mentioned anywhere in the document. In yet other examples, the relevance may be a weighted summation of the count of the number of times the image or an object depicted in the image is mentioned near where the image is to be inserted and a count of the number of times the image or an object is mentioned anywhere in the document (minus the number of times the image is mentioned near where the image is to be inserted). In these examples, mentions of the image or items in the image that are near the insertion point may be weighted more heavily than mentions in other areas of the document. In yet other examples, the count of the number of times the objects depicted in the image are mentioned in the text may be an input into the machine learning algorithm to produce a relevance score.

As noted above the semantic meaning is determined by the semantic meaning determiner 229 which may include a keyword list of objects in the image that may be used to search the document for instances where the objects depicted in the image are mentioned. In addition to exact matches, the system may utilize one or more lists of similar and/or related concepts. Thus, if an image depicts an oak tree, the semantic meaning determiner 229 may return not only a list of specific concepts such as "oak tree," "tree," and "oak", but also related concepts "deciduous tree," "leaf," "acorn," "bark," and the like. The document may also be searched for these related concepts. In some examples, a match on a specific concept may increase the image's relevance to the document more than a match of a related concept. In some examples, the related concepts may be determined from a list of related concepts, and in other examples algorithms such as concept clustering algorithms may be utilized.

Document context determiner 223 may take the image 302, document 304 and other inputs to determine a document context. Document contexts determined by the document context determiner 223 may include a size of the document, a type of document, a free space of the document at a position that the user wishes to insert the image, a layout of other images, an end goal of the user for the document (e.g., a resume, a presentation, a report, and the like) and the like.

Automated image sizer 227 may take as input image characteristics, semantic meanings, document contexts, a user location 306, user preferences 308, user contexts 309, one or more models (e.g., machine learned models) 310, the determined relevance of the image to the document, and other factors. The automated image sizer 227 may utilize one or more algorithms to determine a size for the image. For example, a decision tree, a weighted summation algorithm, a neural network, and the like. The automated image sizer 227 may output a size used by the image scaler 231 to rescale the image that is then used by image inserter 233 to insert the image into the document at the determined size.

As previously noted the various factors may be considered alone or in combination. The image may be scaled based upon one or more methods. In some examples, the one or more of the above-mentioned factors may be converted to a numerical value, weighted, and summed. In other examples, a machine-learning model may be constructed that utilizes these factors in a neural network or other machine-learned model to output a size. In yet other examples, a decision tree or decision forest may be created that utilizes one or more of these factors to render a decision.

The output of the automated image sizer may be an actual size (e.g., a horizontal and vertical pixel size), a relative size (e.g., a percentage of the original image size), a change in size, or the like. For example, a scaling size change % may be calculated based upon the above features. The scaling size change % is the percentage (either positive or negative) that the image is scaled. In some examples, the various features are converted to a numerical score or value, weighted, and summed (or some other combination) to produce a scaling size change factor.

For example:

$$\text{Size Change \%} = W_1 \text{Feature1} + W_2 \text{Feature2} \ldots + W_x \text{Feature}X$$

Where each $W_x$ corresponds to a weighting of a set of features 1 . . . X. The weightings may be determined by a designer of the document creation tool, input by users, or learned through a machine-learning regression model based upon training (image, document, location) tuples that are labeled with ideal image sizes.

In other examples, other machine learning algorithms may be utilized such as convolutional neural networks, decision trees and/or decision forests, and the like. These algorithms may be supervised in that the training data may be explicitly labeled in that a user (e.g., a layout expert) may label training data with an appropriate image size. In other examples, the algorithms may not be supervised, in that the training data may not be explicitly labeled. In some examples, the system may continue to refine the models based upon user feedback. User feedback may comprise the user readjusting the image size after the image is already automatically resized. Because of this feedback the model may be adjusted (e.g., the set of features may be labeled with the user's determined size). In some examples, the models may be initially generic to the user, but in some examples, over time each user may have their own model as the system learns their preferences over time.

Figure 4:
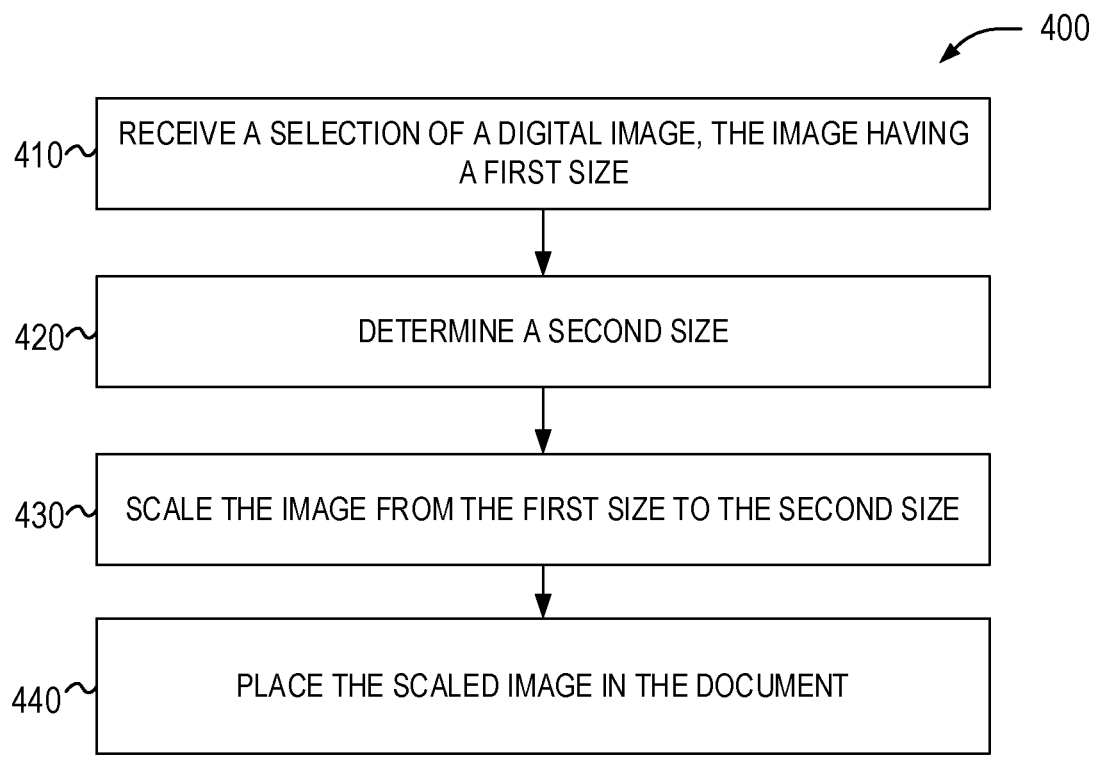
FIG. 4 illustrates a flowchart of a method of automatically resizing an image according to some examples of the present disclosure.

FIG. 4 illustrates a flowchart of a method 400 of automatically resizing an image according to some examples of the present disclosure. At operation 410 the content creation application may receive a selection of a digital image to add to the document. The digital image may have a first size (an original size as stored in a storage device or in memory). The user may also specify a desired placement position of the digital image. The desired placement position may be a location in the digital document where the user wishes to place the image. The desired placement position may be selected by the user in a number of ways depending on how the image is inserted. For example, if the user is dragging the image into the document, the desired image placement position may be the position at which the user releases a mouse button. In other examples, it may be the position of a cursor when the user selects an insert operation. A desired placement position may be an order (e.g., an order of images in a slideshow), or the like. In some examples, multiple images may be selected and the image may determine a size for all the images together.

At operation 420 the system may determine a second size. The second size may be determined based upon one or more features, such as image characteristics, image content, content of the document and context of the image within the document and past user behaviors and preferences. One example feature is a determined relevance of one or more recognized objects depicted in the image to a portion of the digital document in proximity to the desired placement position. The determined relevance may be considered a determined importance of the one or more recognized objects depicted in the image to the portion of the digital document in proximity to the desired placement position. The determined importance may be calculated or determined by the automated image sizer (e.g., automated image sizer 227 or the semantic meaning determiner 229) using the algorithms such as the decision tree, weighted summation, or neural network (e.g., taking as input the determined features). In some examples a determined importance may be measured by the number of times one or more depicted objects in the image are mentioned in the text of the document. The frequency of the number of times one or more depicted objects in the image are mentioned in the text may be an input to the automated image sizer 227.

These features may be collected, gathered, and/or determined by the computing device executing the document editing application, a network-based document application, and the like. The second size may be determined using one or more algorithms and/or rules. For example, a weighted summation, random forest, neural network, and the like. In some examples, multiple different types of algorithms may be utilized. For example, a neural network may be utilized as an input to a decision tree—which may utilize the input from the neural network as one factor in making the scaling decision. Thus, for example, a desire to maintain an aspect ratio of the image may modify a calculated size produced by the neural network. At operation 430 the image may be scaled based on the size. At operation 440 the scaled image may be placed in the document.

As previously discussed, one or more different algorithms may be combined together to produce an image size. As previously described, one algorithm may be an input into another algorithm. In another example, various rules may be utilized to select one of a set of two or more algorithms. For example, a decision tree, or other set of if-then rules may be utilized to decide upon one or more other algorithms to utilize. For example, different neural network models may be used for different types of documents. The document creation application may determine the document type and select the model using a set of rules. Similarly, a different model may be utilized depending on the image characteristics. Thus, an image that is clip-art may be handled by a different model than a high-resolution photo.

Figure 5:
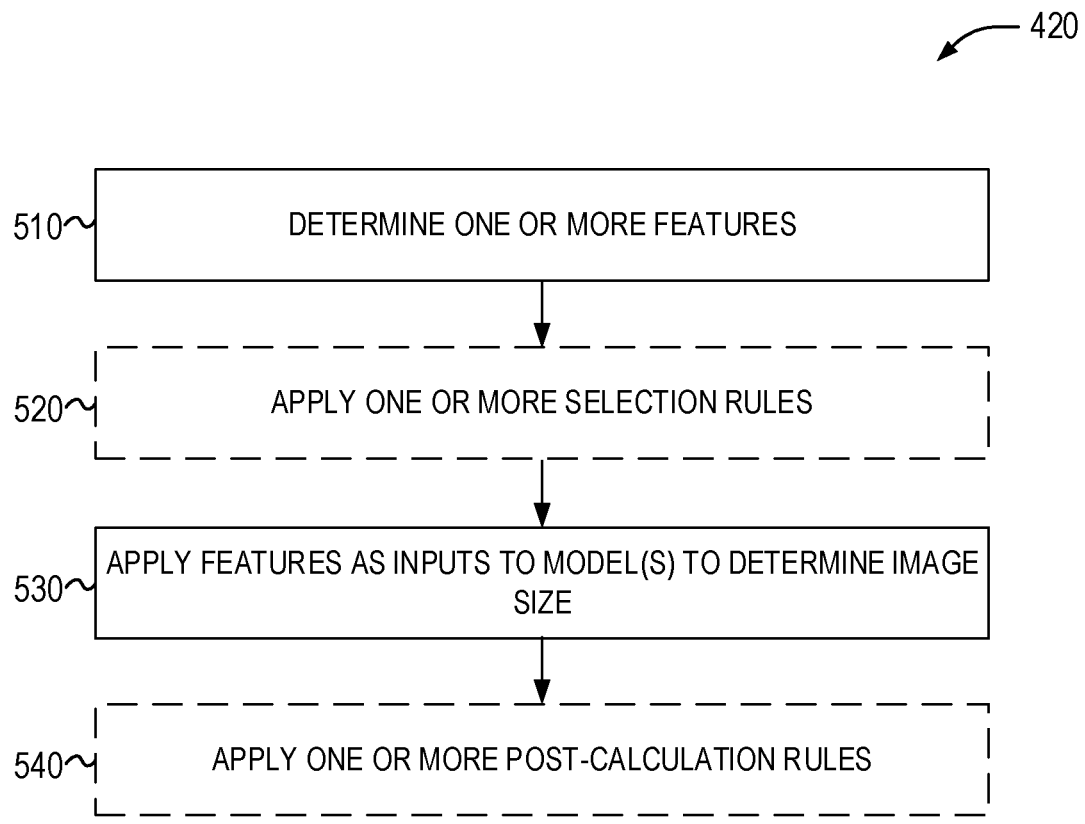
FIG. 5 illustrates a flowchart of a method of determining a new size of an image according to some examples of the present disclosure.

Turning now to FIG. 5 a flowchart of a method 420 of determining a new size of the image is shown according to some examples of the present disclosure. At operation 510, the system may determine one or more image and/or document features. For example, image characteristics; image content; content of the document and context of the image within the document; past user behavior and preferences; and the like.

At operation 520, optionally, the system may apply one or more selection rules. The selection rules may select one or more applicable models or algorithms to determine the image size. In some examples, the selection rules may select one or more features to utilize—e.g., based upon the presence, absence, or value of a different feature. In some examples, the selection rules may select both one or more models and one or more features that are input to those models. For example, if the image is to be placed in a presentation, then the features to utilize may be different than if the image is to be placed in a word document.

At operation 530, the selected features may be supplied to the selected models. For example, some features may be applied to some models, whereas other features may be applied to other models and in other examples, all features may be applied to all selected models. At operation 540, optionally, the results of the one or more models may be combined and/or modified based upon one or more features. For example, a rule may specify that a size is to be adjusted to maintain an aspect ratio of the image. Thus, the new size of the image may be scaled up or down an appropriate amount to get the new size to be an appropriate aspect ratio.

Figure 6:
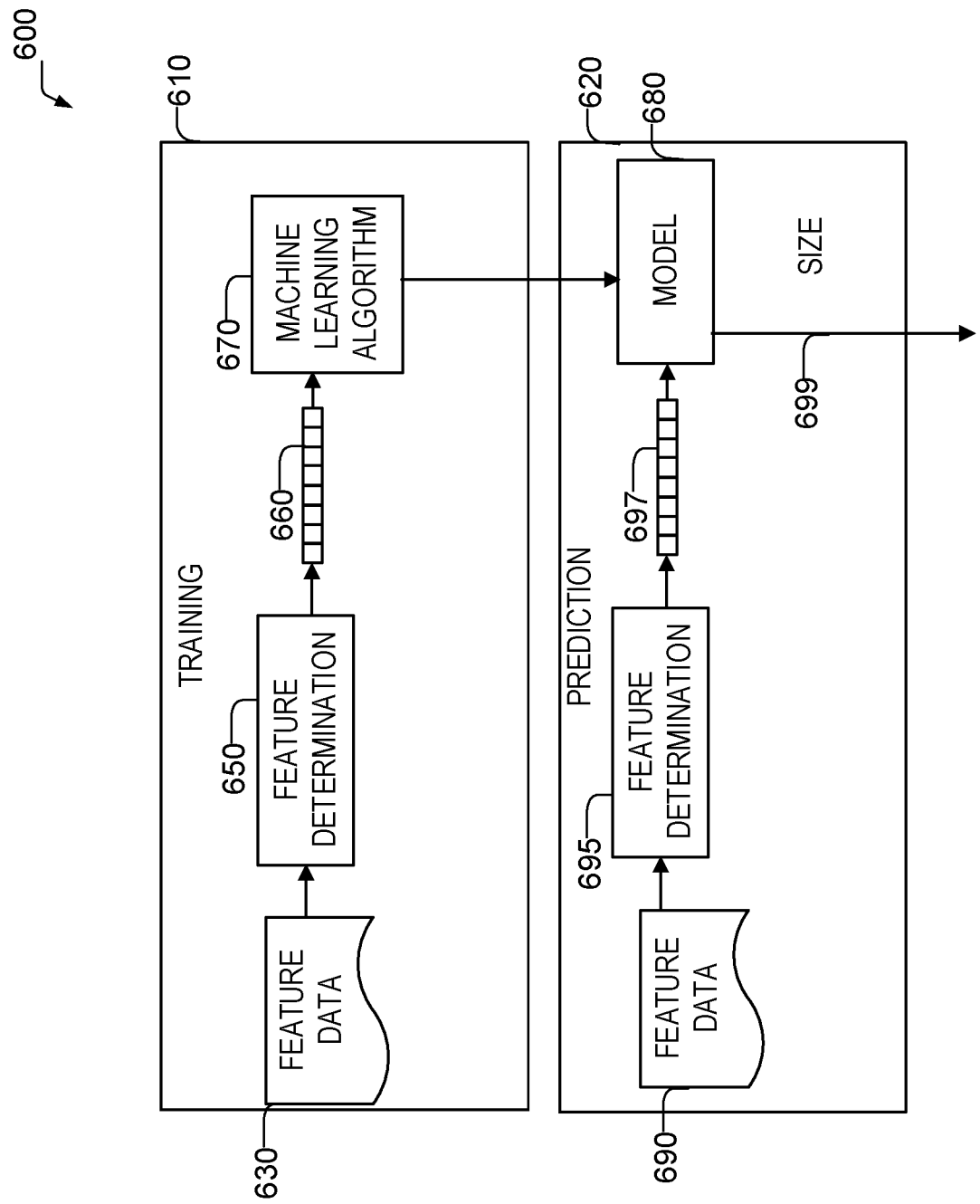
FIG. 6 illustrates an example machine learning module according to some examples of the present disclosure.

FIG. 6 shows an example machine learning module 600 according to some examples of the present disclosure. Machine learning module 600 is one example component of automated image sizer 227 and may produce one or more models 680 that may be examples of the models 310. Machine learning module 600 utilizes a training module 610 and a prediction module 620. Training module 610 feeds feature data 630 into feature determination module 650. The feature data 630 includes previous features, including image related features and document related features. In some examples, the features may be explicitly labeled with an appropriate size or offset (from the original size). For example, the document creation application may monitor user sizing of images and collect the various document and imaging features to use to train the model (with user approval and consent). In these examples, the labels may be the size of the images.

Feature determination module 650 determines one or more features for feature vector 660 from this information. Features of the feature vector 660 are a set of the information input and is information determined to be predictive of a size. Features may be all the feature data 630 or in some examples, may be a subset of all the feature data 630. Thus, part of training the machine learning model 680 is determining an importance of the feature data 630 to predicting an appropriate size. In examples in which the features are a subset of the feature data 630, a predetermined list of which feature data 630 is included as a feature may be utilized. The feature vector 660 may be utilized (along with any applicable labels) by the machine learning algorithm 670 to produce a model 680.

In the prediction module 620, the feature data of the current image and document 690 may be input to the feature determination module 695. Feature determination module 695 may determine the same set of features or a different set of features as feature determination module 650. In some examples, feature determination module 650 and 695 are the same module. Feature determination module 695 produces feature vector 697, which are input into the model 680 to generate an image size 699.

The training module 610 may operate in an offline manner to train the model 680. The prediction module 620, however, may be designed to operate in an online manner.

It should be noted that the model 680 may be periodically updated via additional training and/or user feedback. For example, additional feature data 630 may be collected as users adjust image sizes based upon document contexts.

The machine learning algorithm 670 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 610.

Figure 7:
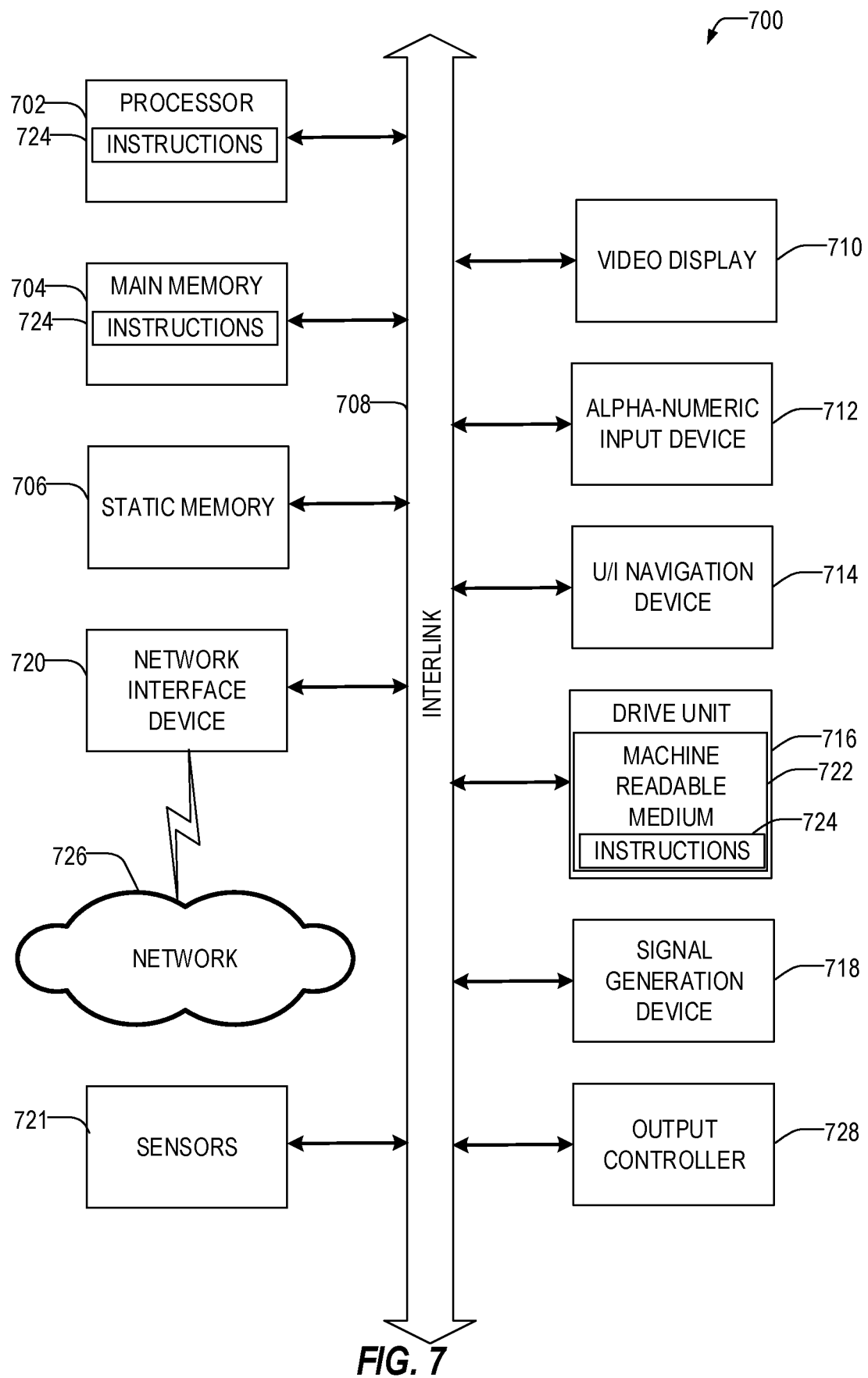
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 700 may be an example of computing device 210 and may execute the document creation application 215, implement the GUIs of FIG. 1, the components of FIG. 3, the methods of FIGS. 4 and 5, and the machine learning modules of FIG. 6. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms ("modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720. The Machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

Other Notes and Examples

Example 1 is a method for automated digital image scaling, the method comprising: receiving a selection of a digital image and a desired placement position in a digital document, the digital image having a first size; automatically determining a second size of the digital image, the second size different than the first size and calculated based upon a determined relevance of one or more recognized objects depicted in the digital image to a portion of the digital document; automatically scaling the digital image from the first size to the second size; and automatically placing the scaled digital image in the digital document at the desired placement position.

In Example 2, the subject matter of Example 1 includes, wherein the one or more recognized objects depicted in the digital image comprise textual content in the digital image.

In Example 3, the subject matter of Examples 1-2 includes, wherein the one or more recognized objects depicted in the digital image comprise recognized faces in the digital image.

In Example 4, the subject matter of Examples 1-3 includes, wherein the one or more recognized objects depicted in the digital image comprise one of: logos, icons, decorations, or clip art.

In Example 5, the subject matter of Examples 1-4 includes, wherein the determined relevance of one or more recognized objects depicted in the digital image to a portion of the digital document comprises a match between a semantic meaning of textual content within a defined proximity to the desired placement position and at least one of the one or more recognized objects.

In Example 6, the subject matter of Example 5 includes, wherein automatically determining the second size of the digital image, the second size different than the first size and calculated based upon the determined relevance of one or more recognized objects depicted in the digital image to the portion of the digital document comprises: calculating the second size based upon a frequency with which one of the one or more recognized objects is mentioned in text of the digital document.

In Example 7, the subject matter of Examples 5-6 includes, wherein automatically determining the second size of the digital image, the second size different than the first size and calculated based upon the determined relevance of one or more recognized objects depicted in the digital image to the portion of the digital document comprises: calculating the second size based upon a relevance of one or more recognized objects depicted in the digital image to one or more recognized objects in a second digital image that are already in the digital document and that are within a defined proximity to the desired placement position.

In Example 8, the subject matter of Examples 1-7 includes, calculating a semantic meaning of the digital image based upon the one or more recognized objects depicted in the digital image; and wherein determining the second size of the digital image, the second size different than the first size and calculated based upon the determined relevance of one or more recognized objects depicted in the digital image to the portion of the digital document comprises: comparing the recognized objects depicted in the digital image to recognized objects depicted in one or more other digital images in the digital document.

In Example 9, the subject matter of Examples 1-8 includes, wherein determining the second size of the digital image, is further based upon one or more of: a resolution, an aspect ratio, or a color profile.

Example 10 is a machine-readable medium for automated digital image scaling, the machine-readable medium comprising instructions, which when performed by a machine, causes the machine to perform operations comprising: receiving a selection of a digital image and a desired placement position in a digital document, the digital image having a first size; automatically determining a second size of the digital image, the second size different than the first size and calculated based upon a determined relevance of one or more recognized objects depicted in the digital image to a portion of the digital document; automatically scaling the digital image from the first size to the second size; and automatically placing the scaled digital image in the digital document at the desired placement position.

In Example 11, the subject matter of Example 10 includes, wherein the one or more recognized objects depicted in the digital image comprise textual content in the digital image.

In Example 12, the subject matter of Examples 10-11 includes, wherein the one or more recognized objects depicted in the digital image comprise recognized faces in the digital image.

In Example 13, the subject matter of Examples 10-12 includes, wherein the one or more recognized objects depicted in the digital image comprise one of: logos, icons, decorations, or clip art.

In Example 14, the subject matter of Examples 10-13 includes, wherein the determined relevance of one or more recognized objects depicted in the digital image to a portion of the digital document comprises a match between a semantic meaning of textual content within a defined proximity to the desired placement position and at least one of the one or more recognized objects.

In Example 15, the subject matter of Example 14 includes, wherein the operations of automatically determining the second size of the digital image, the second size different than the first size and calculated based upon the determined relevance of one or more recognized objects depicted in the digital image to the portion of the digital document comprises: calculating the second size based upon a frequency with which one of the one or more recognized objects is mentioned in text of the digital document.

In Example 16, the subject matter of Examples 14-15 includes, wherein the operations of automatically determining the second size of the digital image, the second size different than the first size and calculated based upon the determined relevance of one or more recognized objects depicted in the digital image to the portion of the digital document comprises: calculating the second size based upon a relevance of one or more recognized objects depicted in the digital image to one or more recognized objects in a second digital image that are already in the digital document and that are within a defined proximity to the desired placement position.

In Example 17, the subject matter of Examples 10-16 includes, wherein the operations further comprise: calculating a semantic meaning of the digital image based upon the one or more recognized objects depicted in the digital image; and wherein determining the second size of the digital image, the second size different than the first size and calculated based upon the determined relevance of one or more recognized objects depicted in the digital image to the portion of the digital document comprises: comparing the recognized objects depicted in the digital image to recognized objects depicted in one or more other digital images in the digital document.

In Example 18, the subject matter of Examples 10-17 includes, wherein the operations of determining the second size of the digital image, is further based upon one or more of: a resolution, an aspect ratio, or a color profile.

Example 19 is a computing device for automated digital image scaling, the computing device comprising: a processor; a memory, the memory comprising instructions, which when executed by the processor, cause the computing device to perform operations comprising: receiving a selection of a digital image and a desired placement position in a digital document, the digital image having a first size; automatically determining a second size of the digital image, the second size different than the first size and calculated based upon a determined relevance of one or more recognized objects depicted in the digital image to a portion of the digital document; automatically scaling the digital image from the first size to the second size; and automatically placing the scaled digital image in the digital document at the desired placement position.

In Example 20, the subject matter of Example 19 includes, wherein the one or more recognized objects depicted in the digital image comprise textual content in the digital image.

In Example 21, the subject matter of Examples 19-20 includes, wherein the one or more recognized objects depicted in the digital image comprise recognized faces in the digital image.

In Example 22, the subject matter of Examples 19-21 includes, wherein the one or more recognized objects depicted in the digital image comprise one of: logos, icons, decorations, or clip art.

In Example 23, the subject matter of Examples 19-22 includes, wherein the determined relevance of one or more recognized objects depicted in the digital image to a portion of the digital document comprises a match between a semantic meaning of textual content within a defined proximity to the desired placement position and at least one of the one or more recognized objects.

In Example 24, the subject matter of Example 23 includes, wherein the operations of automatically determining the second size of the digital image, the second size different than the first size and calculated based upon the determined relevance of one or more recognized objects depicted in the digital image to the portion of the digital document comprises: calculating the second size based upon a frequency with which one of the one or more recognized objects is mentioned in text of the digital document.

In Example 25, the subject matter of Examples 23-24 includes, wherein the operations of automatically determining the second size of the digital image, the second size different than the first size and calculated based upon the determined relevance of one or more recognized objects depicted in the digital image to the portion of the digital document comprises: calculating the second size based upon a relevance of one or more recognized objects depicted in the digital image to one or more recognized objects in a second digital image that are already in the digital document and that are within a defined proximity to the desired placement position.

In Example 26, the subject matter of Examples 19-25 includes, wherein the operations further comprise: calculating a semantic meaning of the digital image based upon the one or more recognized objects depicted in the digital image; and wherein determining the second size of the digital image, the second size different than the first size and calculated based upon the determined relevance of one or more recognized objects depicted in the digital image to the portion of the digital document comprises: comparing the recognized objects depicted in the digital image to recognized objects depicted in one or more other digital images in the digital document.

In Example 27, the subject matter of Examples 19-26 includes, wherein the operations of determining the second size of the digital image, is further based upon one or more of: a resolution, an aspect ratio, or a color profile.

Example 28 is a computing device for automated digital image scaling, the computing device comprising: means for receiving a selection of a digital image and a desired placement position in a digital document, the digital image having a first size; means for automatically determining a second size of the digital image, the second size different than the first size and calculated based upon a determined relevance of one or more recognized objects depicted in the digital image to a portion of the digital document; means for automatically scaling the digital image from the first size to the second size; and means for automatically placing the scaled digital image in the digital document at the desired placement position.

In Example 29, the subject matter of Example 28 includes, wherein the one or more recognized objects depicted in the digital image comprise textual content in the digital image.

In Example 30, the subject matter of Examples 28-29 includes, wherein the one or more recognized objects depicted in the digital image comprise recognized faces in the digital image.

In Example 31, the subject matter of Examples 28-30 includes, wherein the one or more recognized objects depicted in the digital image comprise one of: logos, icons, decorations, or clip art.

In Example 32, the subject matter of Examples 28-31 includes, wherein the determined relevance of one or more recognized objects depicted in the digital image to a portion of the digital document comprises a match between a semantic meaning of textual content within a defined proximity to the desired placement position and at least one of the one or more recognized objects.

In Example 33, the subject matter of Example 32 includes, wherein the means for automatically determining the second size of the digital image, the second size different than the first size and calculated based upon the determined relevance of one or more recognized objects depicted in the digital image to the portion of the digital document comprises: means for calculating the second size based upon a frequency with which one of the one or more recognized objects is mentioned in text of the digital document.

In Example 34, the subject matter of Examples 32-33 includes, wherein the means for automatically determining the second size of the digital image, the second size different than the first size and calculated based upon the determined relevance of one or more recognized objects depicted in the digital image to the portion of the digital document comprises: means for calculating the second size based upon a relevance of one or more recognized objects depicted in the digital image to one or more recognized objects in a second digital image that are already in the digital document and that are within a defined proximity to the desired placement position.

In Example 35, the subject matter of Examples 28-34 includes, means for calculating a semantic meaning of the digital image based upon the one or more recognized objects depicted in the digital image; and wherein the means for determining the second size of the digital image, the second size different than the first size and calculated based upon the determined relevance of one or more recognized objects depicted in the digital image to the portion of the digital document comprises: means for comparing the recognized objects depicted in the digital image to recognized objects depicted in one or more other digital images in the digital document.

In Example 36, the subject matter of Examples 28-35 includes, wherein the means for determining the second size of the digital image, is further based upon one or more of: a resolution, an aspect ratio, or a color profile.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A method for automated digital image scaling, the method comprising:
receiving a selection of a digital image and a desired placement position in a digital document, the digital image having a first size;
automatically determining a second size of the digital image based upon a determined relevance of one or more recognized objects depicted in the digital image to a semantic meaning of textual content of the digital document, the textual content within a defined proximity to the desired placement position, the second size different than the first size;

automatically scaling the digital image from the first size to the second size; and automatically placing the scaled digital image in the digital document at the desired placement position.

2. The method of claim 1, wherein automatically determining the second size of the digital image comprises:

determining the second size based upon the determined relevance of the one or more recognized objects depicted in the digital image to the semantic meaning of the textual content of the digital document and a frequency with which one of the one or more recognized objects are mentioned in the textual content of the digital document.

3. The method of claim 1, wherein automatically determining the second size of the digital image comprises:

determining the second size based upon the determined relevance of the one or more recognized objects depicted in the digital image to the semantic meaning of the textual content of the digital document and a relevance of the one or more recognized objects depicted in the digital image to one or more recognized objects in a second digital image that is already in the digital document and that is within a defined proximity to the desired placement position.

4. The method of claim 1, further comprising:

calculating a semantic meaning of the digital image based upon the one or more recognized objects depicted in the digital image; and wherein automatically determining the second size of the digital image comprises:

determining the second size by submitting the semantic meaning of the textual content, the semantic meaning of the digital image, and the one or more recognized objects to a machine-learned model.

5. The method of claim 1, wherein automatically determining the second size of the digital image comprises: determining the second size based upon the determined relevance of the one or more recognized objects depicted in the digital image to the semantic meaning of the textual content of the digital document and one or more of: a resolution, an aspect ratio, or a color profile.

6. The method of claim 1, wherein automatically determining the second size of the digital image comprises determining the second size based upon the determined relevance of the one or more recognized objects depicted in the digital image to the semantic meaning of textual content of the digital document and based upon past behaviors of a user that selected the desired placement.

7. A machine-readable medium for automated digital image scaling, the machine-readable medium comprising instructions, which when performed by a machine, causes the machine to perform operations comprising:

receiving a selection of a digital image and a desired placement position in a digital document, the digital image having a first size;

automatically determining a second size of the digital image based upon a determined relevance of one or more recognized objects depicted in the digital image to a semantic meaning of textual content of the digital document, the textual content within a defined proximity to the desired placement position, the second size different than the first size;

automatically scaling the digital image from the first size to the second size; and automatically placing the scaled digital image in the digital document at the desired placement position.

8. The machine-readable medium of claim 7, wherein the one or more recognized objects depicted in the digital image comprise textual content in the digital image.

9. The machine-readable medium of claim 7, wherein the one or more recognized objects depicted in the digital image comprise recognized faces in the digital image.

10. The machine-readable medium of claim 7, wherein the one or more recognized objects depicted in the digital image comprise one of: logos, icons, decorations, or clip art.

11. The machine-readable medium of claim 7, wherein the operations of automatically determining the second size of the digital image comprises determining the second size based upon the determined relevance of the one or more recognized objects depicted in the digital image to the semantic meaning of textual content of the digital document and based upon past behaviors of a user that selected the desired placement.

12. A computing device for automated digital image scaling, the computing device comprising:

a processor;

a memory, the memory comprising instructions, which when executed by the processor, cause the computing device to perform operations comprising:

receiving a selection of a digital image and a desired placement position in a digital document, the digital image having a first size;

automatically determining a second size of the digital image based upon a determined relevance of one or more recognized objects depicted in the digital image to a semantic meaning of textual content of the digital document, the textual content within a defined proximity to the desired placement position, the second size different than the first size;

automatically scaling the digital image from the first size to the second size; and automatically placing the scaled digital image in the digital document at the desired placement position.

13. The computing device of claim 12, wherein the one or more recognized objects depicted in the digital image comprise textual content in the digital image.

14. The computing device of claim 12, wherein the one or more recognized objects depicted in the digital image comprise recognized faces in the digital image.

15. The computing device of claim 12, wherein the one or more recognized objects depicted in the digital image comprise one of: logos, icons, decorations, or clip art.

16. The computing device of claim 12, wherein the operations of automatically determining the second size of the digital image comprises:

determining the second size based upon the determined relevance of the one or more recognized objects depicted in the digital image to the semantic meaning of the textual content of the digital document and a frequency with which one of the one or more recognized objects are mentioned in the textual content of the digital document.

17. The computing device of claim 12, wherein the operations of automatically determining the second size of the digital image comprises:

determining the second size based upon the determined relevance of the one or more recognized objects depicted in the digital image to the semantic meaning of the textual content of the digital document and a relevance of one or more recognized objects depicted in the digital image to one or more recognized objects in a second digital image that is already in the digital document and that is within a defined proximity to the desired placement position.

18. The computing device of claim 12, wherein the operations further comprise:
  calculating a semantic meaning of the digital image based upon the one or more recognized objects depicted in the digital image; and
  wherein the operations of automatically determining the second size of the digital image comprises:
  determining the second size by submitting the semantic meaning of the textual content, the semantic meaning of the digital image, and the one or more recognized objects to a machine-learned model.

19. The computing device of claim 12, wherein the operations of automatically determining the second size of the digital image comprises: determining the second size based upon the determined relevance of the one or more recognized objects depicted in the digital image to the semantic meaning of the textual content of the digital document and one or more of: a resolution, an aspect ratio, or a color profile.

20. The computing device of claim 12, wherein the operations of automatically determining the second size of the digital image comprises determining the second size based upon the determined relevance of the one or more recognized objects depicted in the digital image to the semantic meaning of textual content of the digital document and based upon past behaviors of a user that selected the desired placement.

* * * * *